Jan. 26, 1965 H. A. ROSEN 3,167,768
PRECISION TARGET USING SINGLE SIDEBAND MODULATOR
Filed Jan. 19, 1961 2 Sheets-Sheet 1

Inventor
HAROLD A. ROSEN
AGENT
By
ATTORNEYS 3,167,768
PRECISION TARGET USING SINGLE SIDEBAND
MODULATOR
Harold A. Rosen, Santa Monica, Calif., assignor, by mesne assignments, to the United States of America as represented by the Secretary of the Navy
Filed Jan. 19, 1961, Ser. No. 83,854
3 Claims. (Cl. 343—17.7)

The present invention relates to a precision target for CW radar and more particularly to a precision target using a single sideband modulator to provide feed-through or undesired transmitter leakage cancellation thereby furnishing a continuing check of the CW radar systems' sensitivity.

In most prior art CW radar systems wherein the transmitter output is uninterrupted, it is difficult to use a single antenna for both reception and transmission, because both the transmitter and receiver are on all the time. This difficulty has been overcome somewhat through the use of isolation circuits which protect the receiver from a transmitter output up to 200 watts. However with both the single-dish and the low-isolation two-dish variety using a separate antenna for transmitter and receiver there is an undesired transmitter leakage which mixes with the received signal, thereby limiting the performance of the system.

The present device serves to eliminate the above-described difficulties by presenting a precision, simulated target for checking the sensitivity of a radar system under test. This is accomplished by feeding a signal from the radar directly into the simulated target through a calibrated horn. After leaving the horn the signal passes through a 45° gyrator, and then a thruplexer, into a two-gyrator single sideband modulator employing ferrites. Within the modulator an R.F. signal equal in amplitude and opposite in phase to the transmitter leakage is added to the received signal so that the leakage is nulled out, producing at the output of the modulator a single sideband signal which is free of distortion. This distortion-free signal is then fed into the receiver of the radar system.

An object of the invention is the provision of a precision, simulated target for checking radar systems.

Another object of the invention is the provision of a precision target for checking feed-through cancellation.

Still another object is the provision of a precision target which nulls-out feed-through distortion by the use of a single sideband modulator.

Yet another object is the provision of a precision target having a single sideband modulator which uses ferrites.

Figure 1:
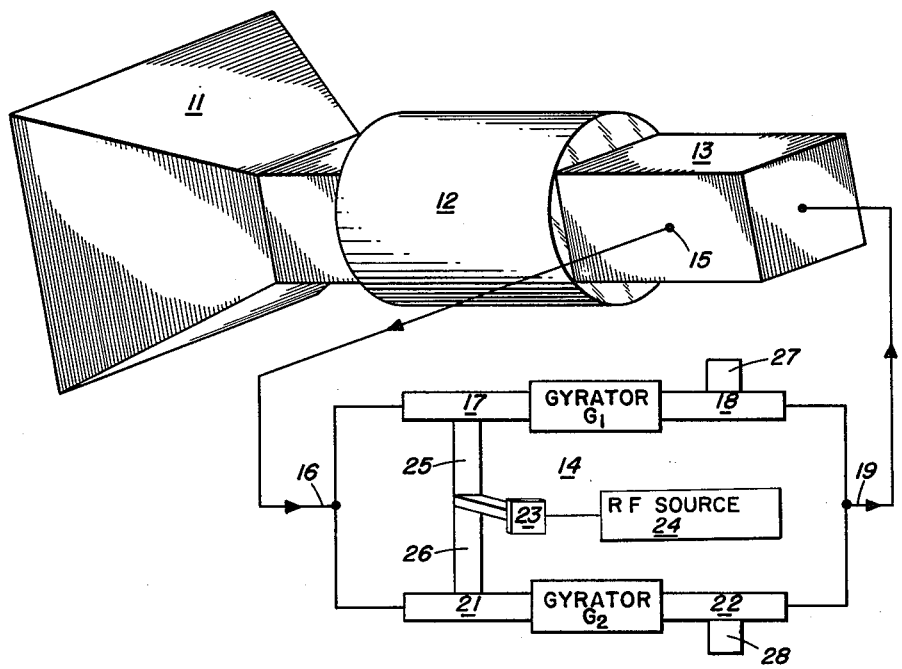
Figure 2:
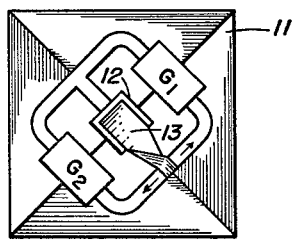
Figure 3:
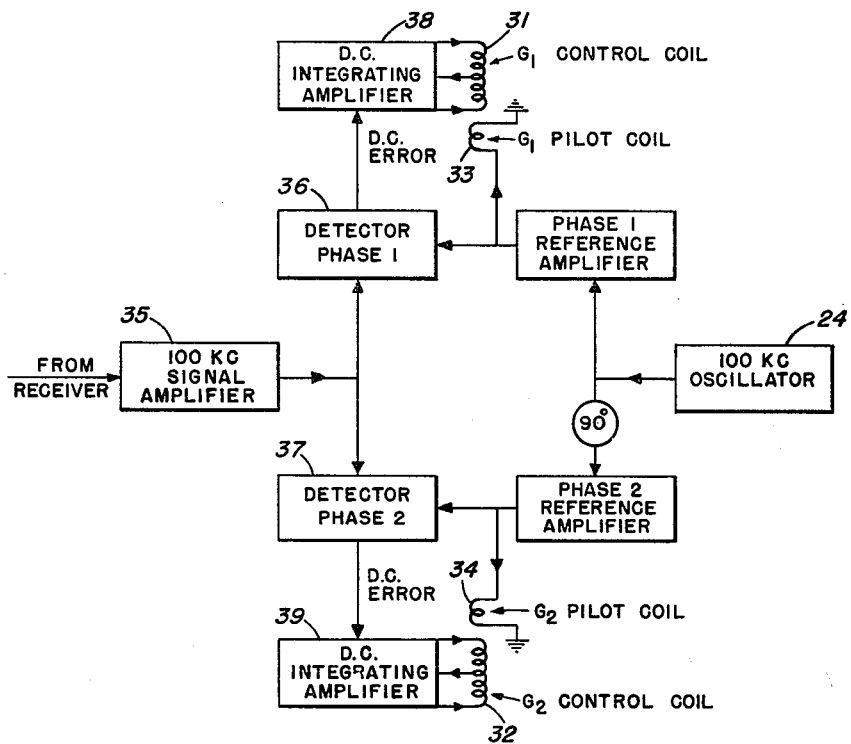
Figure 4:
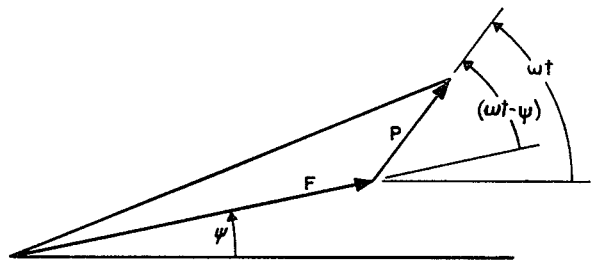

Other objects and many of the attendant advantages of this invention will be readily appreciated as the same become better understood by reference to the following detailed description when considered in connection with the accompanying drawings wherein:

FIG. 1 shows a schematic diagram of the invention.
FIG. 2 shows an end view of the invention.
FIG. 3 shows a block diagram of the electronic control circuit for the modulator.
FIG. 4 shows a vector diagram of the resultant single sideband modulated wave.

Referring now to the drawings wherein like reference characters designate like or corresponding parts throughout the several views there is shown in FIG. 1 a schematic view of a precision, simulated target consisting of a calibrated horn 11 connected to a 45° gyrator 12, which in turn is connected to a thruplexer 13. The 45° gyrator 12 may be referred to as a "lossless" duplexer which accomplishes its rotation through utilization of microwave ferrites. While not truly "lossless," the 0.5 db loss it has is negligible compared to the 6 db loss normally incurred in magic-tee duplexers. The term "thruplexer' is used to describe an orthogonal duo-mode coupler consisting of a square waveguide section, one end of which contains a square port which passes all polarizations, and the other end containing two orthogonal, rectangular ports each of which passes only one linear polarization.

Connected to the thruplexer 13 by means of its port 15 is a single-sideband modulator 14, which consists of a microwave package in which an R.F. signal equal in amplitude and opposite in phase to the feed-through or transmitter leakage is added to the received signal, and an electronic control chassis (which will be described in connection with FIG. 3) which senses residual feed-through and develops corrective commands.

The received energy from port 15 of thruplexer 13 enters the modulator 14 at point 16 and divides evenly in the two arms of the left-hand T. The energy in the upper branch passes through thruplexer 17, gyrator $G_1$, thruplexer 18, the right hand T, and exits at output 19. The energy in the lower branch passes similarly through thruplexer 21, gyrator $G_2$, and thruplexer 22 to join the output from the upper branch at exit 19.

The gyrators $G_1$ and $G_2$ are control elements for the feed-through nulling signal which enters the package 14 at port 23. The Faraday rotation in the gyrators varies between zero and 18 degrees depending upon the magnitude of the feed-through to be cancelled out. At the extreme rotation of 18 degrees, the loss in the received energy due to rotation is $\cos^2 18°$, or less than 0.5 db. R.F. energy direct from the source 24 is coupled into port 23 of the package 14 through a 20 db directional coupler (not shown). This energy divides evenly in arms 25 and 26 whose path lengths differ by a quarter wavelength so that the signals reach thruplexers 17 and 21 in phase quadrature. The polarization of these signals is such that, in the absence of rotation in the control gyrators $G_1$ and $G_2$, none of the signal can leave the modulator, and the energy in this situation is dissipated in loads 27 and 28 coupled to thruplexers 18 and 22.

When gyrator $G_1$ rotates polarization through an angle $\theta_1$, energy in arm 25 is transmitted to output 19 by a factor $\sin^2 \theta$, and to load 27 by a factor $\cos^2 \theta_1$. The voltage transmission factor to output 19 is $\sin \theta_1$, which reverses sign when $\theta_1$ reverses. The same remarks apply to energy in the other arm of the modulator, or in arm 26, which is controlled by the polarization rotation angle $\theta_2$ of gyrator $G_2$. Thus an R.F. signal of any phase and of amplitude up to $-33$ db of the transmitted signal, that is the signal fed into calibrated horn 11, can be added to the signal as delivered at output 19 by properly choosing rotational angles $\theta_1$ and $\theta_2$. The 33 db factor is the sum of 20 db in the directional coupler as used at entrance port 23, 3 db in the split into the two phases as at arms 25 and 26, and 10 db for the maximum rotation of 18 degrees in the gyrators $G_1$ and $G_2$.

Referring now to FIG. 3 there is shown a block diagram of the electronic control chassis of the modulator 14. It can be clearly seen from the figure that gyrators $G_1$ and $G_2$ each have a control coil, as 31 and 32, and also pilot coils as 33 and 34. To pilot coils 33 and 34 are connected a 100 kc. signal of appropriate phase, as from oscillator 24. Since the microwave signals entering via arms 25 and 26 are in phase quadrature as pointed out above, and the 100 kc. modulating signal in gyrators $G_1$ and $G_2$ are also in phase quadrature, the sum of these signals at output 19 is a single frequency pilot signal displaced 100 kc. from the microwave source frequency. Feed-through energy adds to this signal to produce a single-side-frequency modulated wave whose vector diagram is shown in FIG. 4, wherein F is feed-through amplitude, $\psi$ is feed-through phase, $\omega$ is reference radian frequency, and P is pilot signal.

The envelope of this modulated wave has a phase angle determined by the phase of the feed-through and an amplitude determined by the smaller of the two signals F and P. This 100 kc. signal is detected at the video detector of the radar, which can have either an I.F. or crystal video receiver. It is amplified in the 100 kc. signal amplifier 35, and detected in two phase sensitive detectors 36 and 37 having quadrature references (see FIG. 3). The control coils 31 and 32 of gyrators $G_1$ and $G_2$ are driven by integrating D.C. amplifiers 38 and 39 whose inputs are the outputs of the two phase sensitive detectors 36 and 37 respectively, thus adding the proper amplitude and phase of R.F. energy to cancel out the feed-through, which is shown in FIG. 4 as the resultant of vectors F and P.

A constant feed-through signal (as contrasted with a varying signal) can be cancelled to any desired degree by use of the invention, its limitations lying in its response to varying feed-through. The resultant feed-through as a function of frequency can be determined by the approximate transfer-function.

$$\frac{F_r}{F_i}=\frac{T_p}{1+T_p} \quad (1)$$

where $F_r$ is the resultant feed-through, $F_i$ is the input feed-through, T is the first order time constant of the system, and $p$ is the differential operator $d/dt$. Because the target Doppler is merely a varying feed-through signal, T must be chosen large enough so that low frequency Dopplers are not inordinately degenerated. In the selection of T, consideration must be given to the fact that low frequency ground return signals are also degenerated by the system, and that in an airborne radar for missile illumination the required range of the radar is much less for low frequency Dopplers than for high. Thus T may be on the order of 40 microseconds for an X-band airborne radar, while perhaps 1000 microseconds would be more appropriate for a ground based L-band search radar.

In summary, the signal for feed-through cancellation is generated by modulating each of the ferrite gyrators at a high frequency, using equal amplitudes and quadrature phases for the two modulating signals. Each gyrator produces at its output a double sideband, suppressed carrier signal. The superposition of two sets of such signals cause enhancement of one sideband and cancellation of the other, since the microwave paths, like the modulating signals, are in quadrature.

From the above description it can be clearly seen that the present invention presents an effective and simple precision target for testing the operation of CW radars having undesirable transmitter leakage, through the expedient of cancelling this feed-through to leave an undistorted echo. The radar under test emits its signal into the horn of the precision target, from which the signal goes to a single side-band modulator employing ferrite gyrators. The gyrators rotate the signal through the proper number of degrees, to produce a pilot signal equal to the undesired feed-through signal in amplitude and in phase. This pilot signal then effectively cancels the feed-through to supply an undistorted signal to the receiver of the radar as though it was an undistorted echo received by the radar.

Obviously many modifications and variations of the present invention are possible in the light of the above teachings. It is therefore to be understood that within the scope of the appended claims the invention may be practiced otherwise than as specifically described.

What is claimed is:

1. A precision target for monitoring radar systems through cancellation of transmitter feed-through comprising a calibrated horn for receiving microwave energy, a 45° gyrator connected to the output of said horn, coupling means having at least two ports connected to said 45° gyrator, single sideband modulating means, means connecting one port of the coupling means and the input of the modulating means, first and second signal paths within said modulating means, first and second rator in each of said signal paths, and means connecting the output of said modulating means with another port of said coupling means.

2. A precision target for monitoring radar systems by cancelling undesired transmitter leak-through comprising a calibrated horn for receiving microwave energy, a 45° gyrator connected to the output of said horn, coupling means having one port which passes all polarizations and two ports which pass only one linear polarization, said two ports which pass only one linear polarization being at right angles to each other, said coupling means being connected to said gyrator at the port which passes all polarizations, and a single side-band modulator having its input connected to one of the linear polarization ports of the coupling means and its output connected to the other of the linear polarization ports whereby the output from the modulator is at the correct phase to cancel out the undesired transmitter leak-through portion of the received microwave signal.

3. The precision target as set forth in claim 2 wherein the input to the modulator divides into two quadrature signals, separate ferrite gyrators for each of said signals, and means for combining the two modulated signals to form a single sideband signal.

References Cited by the Examiner
UNITED STATES PATENTS

| 2,830,290 | 4/58 | Mercer | 343—17.7 |
| 3,007,157 | 10/61 | Rosen | 343—8 |
| 3,021,521 | 2/62 | Hutchins | 343—8 |
| 3,029,427 | 4/62 | Rosen | 343—8 |
| 3,077,593 | 2/63 | Gross | 343—5 |

CHESTER L. JUSTUS, *Primary Examiner.*

KATHLEEN CLAFFY, *Examiner.*

UNITED STATES PATENT OFFICE
CERTIFICATE OF CORRECTION

Patent No. 3,167,768            Januray 26, 1965

Harold A. Rosen

It is hereby certified that error appears in the above numbered patent requiring correction and that the said Letters Patent should read as corrected, below.

Column 4, line 21, for "first and second" read -- a ferrite gy- --.

Signed and sealed this 14th day of September 1965.

(SEAL)
Attest:

ERNEST W. SWIDER            EDWARD J. BRENNER
Attesting Officer            Commissioner of Patents